(12) United States Patent
Usuda et al.

(10) Patent No.: US 8,169,954 B2
(45) Date of Patent: May 1, 2012

(54) TRANSMISSION RATE CONTROL METHOD, MOBILE STATION, RADIO BASE STATION, AND RADIO NETWORK CONTROLLER

(75) Inventors: Masafumi Usuda, Tokyo (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1315 days.

(21) Appl. No.: 11/505,352

(22) Filed: Aug. 17, 2006

(65) Prior Publication Data

US 2007/0041342 A1    Feb. 22, 2007

(30) Foreign Application Priority Data

Aug. 19, 2005    (JP) ............................... P2005-239190

(51) Int. Cl.
*H04W 4/00* (2009.01)
*H04B 7/00* (2006.01)

(52) U.S. Cl. ..................... 370/329; 455/515; 455/522

(58) Field of Classification Search ................. 370/329, 370/340, 431, 433; 455/450, 452.2, 522; 450/515
See application file for complete search history.

(56) References Cited

U.S. PATENT DOCUMENTS

| 7,126,928 | B2 * | 10/2006 | Tiedemann et al. ........... 370/329 |
| 2002/0045448 | A1 | 4/2002 | Park et al. |
| 2002/0077111 | A1 * | 6/2002 | Spaling et al. ................ 455/453 |
| 2002/0136242 | A1 * | 9/2002 | Niemela ....................... 370/523 |
| 2003/0078067 | A1 * | 4/2003 | Kim et al. ..................... 455/522 |
| 2003/0100298 | A1 * | 5/2003 | Butler ........................... 455/422 |
| 2004/0151133 | A1 * | 8/2004 | Yi et al. ........................ 370/312 |
| 2005/0030964 | A1 | 2/2005 | Tiedemann, Jr. et al. |
| 2005/0048975 | A1 * | 3/2005 | Ranta-Aho et al. .......... 455/438 |
| 2005/0208959 | A1 * | 9/2005 | Chen et al. ................... 455/515 |
| 2006/0023629 | A1 * | 2/2006 | Kim et al. ..................... 370/235 |

(Continued)

FOREIGN PATENT DOCUMENTS

CN    1337800 A    2/2002

(Continued)

OTHER PUBLICATIONS

"Universal Mobile Telecommunications System (UMTS); FDD enhanced uplink; Overall description; Stage 2 (3GPP TS 25.309 version 6.1.0 Release 6); ETSI TS 125309", ETSI Standards, European Telecommunications Standards Institute, Sophia-Antipo, FR, vol. 3-R2, V610, Dec. 2004, XP014027652.

(Continued)

*Primary Examiner* — Rafael Pérez-Gutiérrez
*Assistant Examiner* — Allahyar Kasraian
(74) *Attorney, Agent, or Firm* — Marvin A. Motsenbocker; Mots Law, PLLC

(57) ABSTRACT

A transmission rate control method for controlling, at a mobile station, a transmission rate of uplink user data, in a radio communication system capable of controlling a transmission rate of uplink user data based on an absolute transmission rate transmitted via an E-AGCH and a relative transmission rate transmitted via a E-RGCH, includes: notifying, from a radio network controller to the mobile station, information for identifying the E-AGCH to be transmitted from a serving cell, and not notifying, from the radio network controller to the mobile station, information for identifying the E-RGCH, when the mobile station establishes an E-DPDCH; and controlling, at the mobile station, the transmission rate of uplink user data, based on the absolute transmission rate which is received from the serving cell via the E-AGCH, without considering the relative transmission rate.

6 Claims, 14 Drawing Sheets

U.S. PATENT DOCUMENTS

| | | | |
|---|---|---|---|
| 2006/0056355 A1* | 3/2006 | Love et al. | 370/332 |
| 2006/0159016 A1* | 7/2006 | Sagfors et al. | 370/230 |
| 2006/0166673 A1* | 7/2006 | Vasudevan | 455/439 |
| 2006/0215604 A1* | 9/2006 | Mueckenheim et al. | 370/329 |
| 2006/0268773 A1* | 11/2006 | Ranta-aho et al. | 370/329 |
| 2006/0270432 A1* | 11/2006 | Dominique et al. | 455/522 |
| 2007/0025300 A1* | 2/2007 | Terry et al. | 370/335 |
| 2007/0064640 A1* | 3/2007 | Grilli et al. | 370/320 |

FOREIGN PATENT DOCUMENTS

| | | |
|---|---|---|
| EP | 1 691 513 A1 | 8/2006 |
| EP | 1691513 A | 8/2006 |
| WO | WO 2006/081874 A1 * | 8/2006 |

OTHER PUBLICATIONS

3GPP TSG-RAN TS25.331 V6.5.0. (Mar. 2005); 3rd Generation Partnership Project; Technical Specification Group Radio Access Network; Radio Resource Control (RRC); Protocol Specification (Release 6).

Official Action Letter issued on Oct. 16, 2007 in the Counterpart Russian Patent Application.

NTT DoCoMo, Inc.;"EDCH scheduling simplification";3GPP TSG RAN Plenary meeting #27;RP-050147,pp. 1-2 (Mar. 9-11, 2005)(Cited in the official action issued in the counterpart Japanese patent application).

* cited by examiner

TRANSMISSION RATE CONTROL METHOD, MOBILE STATION, RADIO BASE STATION, AND RADIO NETWORK CONTROLLER

CROSS REFERENCE TO RELATED APPLICATION

This application is based upon and claims the benefit of priority from the prior Japanese Patent Application No. P2005-239190, filed on Aug. 19, 2005; the entire contents of which are incorporated herein by reference.

BACKGROUND OF THE INVENTION

1. Field of the Invention

The present invention relates to a transmission rate control method for controlling, at a mobile station, a transmission rate of uplink user data, in a radio communication system capable of controlling a transmission rate of uplink user data based on an absolute transmission rate of uplink user data which is transmitted via an absolute transmission rate control channel and a relative transmission rate of uplink user data which is transmitted a relative transmission rate control channel, and a mobile station, a radio base station, and a radio network controller used in the transmission rate control method.

2. Description of the Related Art

In a conventional mobile communication system, when setting a Dedicated Physical Channel (DPCH) between a mobile station UE and a radio base station Node B, a radio network controller RNC is configured to determine a transmission rate of uplink user data, in consideration of hardware resources for receiving of the radio base station Node B (hereinafter, hardware resource), a radio resource in an uplink (an interference volume in an uplink), a transmission power of the mobile station UE, a transmission processing performance of the mobile station UE, a transmission rate required for an upper application, or the like, and to notify the determined transmission rate of the uplink user data by a message of a layer-3 (Radio Resource Control Layer) to both of the mobile station UE and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that a transmission rate of a channel used for the data communications is changed fast.

However, as shown in FIG. 1, the radio network controller RNC integrally controls a plurality of radio base stations Node B in general. Therefore, in the conventional mobile communication system, there has been a problem that it is difficult to perform fast control for changing of the transmission rate of uplink user data (for example, per approximately 1 through 100 ms), due to the increase of processing load and processing delay in the radio network controller RNC.

In addition, in the conventional mobile communication system, there has been also a problem that costs for implementing an apparatus and for operating a network are substantially increased even if the fast control for changing of the transmission rate of the uplink user data can be performed.

Therefore, in the conventional mobile communication system, control for changing of the transmission rate of the uplink user data is generally performed on the order from a few hundred ms to a few seconds.

Accordingly, in the conventional mobile communication system, when burst data transmission is performed as shown in FIG. 2A, the data are transmitted by accepting low-speed, high-delay, and low-transmission efficiency as shown in FIG. 2B, or, as shown in FIG. 2C, by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIGS. 2B and 2C.

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the uplink radio resources effectively. Such discussions or discussed functions will be hereinafter referred to as "Enhanced Uplink (EUL)".

Referring to FIG. 3, the mobile communication system, to which the "Enhanced Uplink" is applied, will be described.

In an example of FIG. 3, the cell #3 controlled by the radio base station Node B #1 is a serving cell for a mobile station UE, which mainly controls the transmission rate of uplink user data transmitted by the mobile station UE.

The cell #4 controlled by the radio base station Node B #2 is a non-serving cell for the mobile station UE, which sets a radio link with the mobile station UE as well as the serving cell.

In the above mobile communication system, the cell #3 (the serving cell for the mobile station UE) is configured to transmit, to the mobile station UE, an "Enhanced Absolute Grant Channel (E-AGCH, absolute transmission rate control channel)" for transmitting an absolute transmission rate of uplink user data and an "Enhanced Relative Grant Channel (E-RGCH, relative transmission rate control channel)" for transmitting a relative transmission rate of uplink user data (for example, UP Command or DOWN Command).

Further, in the above mobile communication system, the mobile station UE is configured to transmit an "Enhanced Dedicated Physical Control Channel (E-DPCCH)" and an "Enhanced Dedicated Physical Data Channel (E-DPDCH)" to the cell #3 (the serving cell).

Furthermore, in the above mobile communication system, the cell #4 (the non-serving cell for the mobile station UE) is configured to transmit the E-RGCH to the mobile station UE.

Here, in the above mobile communication system, the radio network controller RNC is configured to notify, to the mobile station UE, the information for identifying the E-RGCH transmitted from the cell #3 (the serving cell for the mobile station UE) and the information for identifying the E-AGCH transmitted from the cell #3 (the serving cell for the mobile station UE), when the mobile station UE establishes a data connection (a Dedicated Channel (DCH)/E-DPDCH) for transmitting uplink user data. Such information includes channelization codes, sequence pattern, and the like.

Then, the mobile station UE is configured to perform a receive processing of the E-RGCH, which is transmitted from the serving cell, using the channelization codes and the sequence pattern for the E-RGCH. When the mobile station UE cannot determine the relative transmission rate of the uplink user data transmitted via the E-RGCH, the mobile station UE is configured to maintain the transmission rate of the uplink user data. When the mobile station UE can determine the relative transmission rate of the uplink user data transmitted via the E-RGCH (UP Command or DOWN Command), the mobile station UE is configured to change the transmission rate of the uplink user data based on the determined result.

By the way, a mobile communication system in which the serving cell transmits only the E-AGCH and does not transmit the E-RGCH so as to decrease loads in radio downlink can be considered.

However, in the mobile communication system, the E-RGCH will be defined in the mobile station UE when the mobile station UE establishes a data connection (DCH, E-DPDCH) for transmitting the uplink user data, in general. Accordingly, there has been a problem that the mobile station UE cannot determine whether or not the serving cell is transmitting the E-RGCH.

In other words, the mobile station UE may detect the E-RGCH erroneously due to noise and the like, and may change the transmission rate of the uplink user data unnecessarily, even when the serving cell does not transmit the E-RGCH. Accordingly, there has been a problem that the utilization efficiency of radio resources may be decreased.

BRIEF SUMMARY OF THE INVENTION

The present invention has been made considering the problems, and its object is to provide a transmission rate control method which enables to prevent a mobile station from detecting a relative transmission rate control channel (E-RGCH) erroneously, and to allocate radio resources efficiently, when a serving cell for the mobile station does not transmit the relative transmission rate control channel, and a mobile station, a radio base station, and a radio network controller.

A first aspect of the present invention is summarized as a transmission rate control method for controlling, at a mobile station, a transmission rate of uplink user data, in a radio communication system capable of controlling a transmission rate of uplink user data based on an absolute transmission rate of uplink user data which is transmitted via an absolute transmission rate control channel and a relative transmission rate of uplink user data which is transmitted via a relative transmission rate control channel, including: notifying, from a radio network controller to the mobile station, information for identifying the absolute transmission rate control channel to be transmitted from a serving cell, and not notifying, from the radio network controller to the mobile station, information for identifying the relative transmission rate control channel, when the mobile station establishes a data connection for transmitting the uplink user data; and controlling, at the mobile station, the transmission rate of uplink user data, based on the absolute transmission rate of the uplink user data which is transmitted from the serving cell via the absolute transmission rate control channel, without considering the relative transmission rate of the uplink user data, regardless of whether or not the relative transmission rate control channel is transmitted.

In the first aspect, the transmission rate control method can further includes: notifying, from the radio network controller to a radio base station which controls the serving cell, the information for identifying the absolute transmission rate control channel to be transmitted from the serving cell, and not notifying, from the radio network controller to the radio base station, the information for identifying the relative transmission rate control channel, when the mobile station establishes the data connection for transmitting the uplink user data; and transmitting, at the serving cell, the absolute transmission rate control channel to the mobile station, and not transmitting the relative transmission rate control channel to the mobile station.

A second aspect of the present invention is summarized as a mobile station for controlling a transmission rate of uplink user data, in a radio communication system capable of controlling a transmission rate of uplink user data based on an absolute transmission rate of uplink user data which is transmitted via an absolute transmission rate control channel and a relative transmission rate of uplink user data which is transmitted via a relative transmission rate control channel; wherein the mobile station is configured to control the transmission rate of the uplink user data, based on the absolute transmission rate of the uplink user data which is transmitted from a serving cell for the mobile station via the absolute transmission rate control channel, without considering the relative transmission rate of the uplink user data, regardless of whether or not the relative transmission rate control channel is transmitted, when information for identifying the absolute transmission rate control channel to be transmitted from the serving cell for the mobile station is notified and information for identifying the relative transmission rate control channel is not notified from a radio network controller, and when the mobile station establishes a data connection for transmitting the uplink user data.

A third aspect of the present invention is summarized as a radio base station used in a mobile communication system capable of controlling, at a mobile station, a transmission rate of uplink user data, based on an absolute transmission rate of uplink user data which is transmitted via an absolute transmission rate control channel and a relative transmission rate of uplink user data which is transmitted via a relative transmission rate control channel; wherein a serving cell for the mobile station which is controlled by the radio base station is configured to transmit, to the mobile station, the absolute transmission rate control channel, and not to transmit, to the mobile station, the relative transmission rate control channel, when information for identifying the absolute transmission rate control channel to be transmitted by the serving cell is notified and information for identifying the relative transmission rate control channel is not notified, and when the mobile station establishes a data connection for transmitting the uplink user data.

A fourth aspect of the present invention is summarized as a radio network controller used in a mobile communication system capable of controlling, at a mobile station, a transmission rate of uplink user data, based on an absolute transmission rate of uplink user data which is transmitted via an absolute transmission rate control channel and a relative transmission rate of uplink user data which is transmitted via a relative transmission rate control channel; wherein the radio network controller is configured to notify, to the mobile station, information for identifying the absolute transmission rate control channel to be transmitted by a serving cell for the mobile station, and not to notify, to the mobile station, information for identifying the relative transmission rate control channel, when the mobile station establishes a data connection for transmitting the uplink user data.

In the fourth aspect, the radio network controller can be configured to notify, to a radio base station controlling the serving cell, the information for identifying the absolute transmission rate control channel to be transmitted by the serving cell, and not to notify, to the radio base station, the information for identifying the relative transmission rate con-

DETAILED DESCRIPTION OF THE INVENTION

Configuration of Mobile Communication System According to First Embodiment of the Present Invention Referring to FIGS. 4 to 16, a configuration of a mobile communication system according to a first embodiment of the present invention will be described.

It should be noted that, the mobile communication system according to this embodiment is designed in order to increase a communication performance such as a communication capacity, a communication quality and the like. Further, the mobile communication system according to this embodiment can be applied to "W-CDMA" and "CDMA2000" of the third generation mobile communication system.

Figure 1:
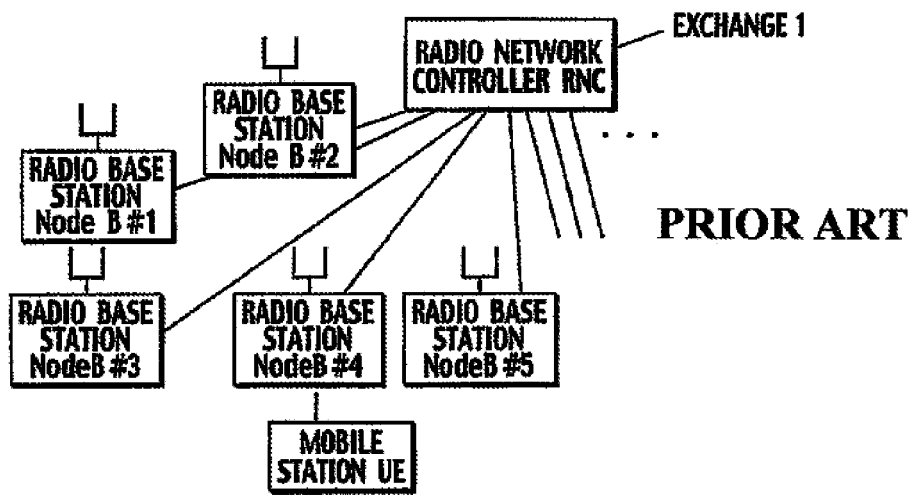
FIG. 1 is diagram of an entire configuration of a general mobile communication system.
Figure 2A:
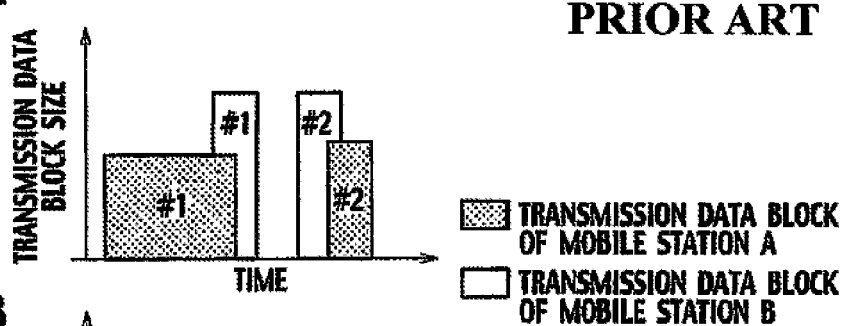
FIGS. 2A to 2C are graphs for explaining the method for controlling a transmission rate of uplink user data in a conventional mobile communication system.
Figure 2B:
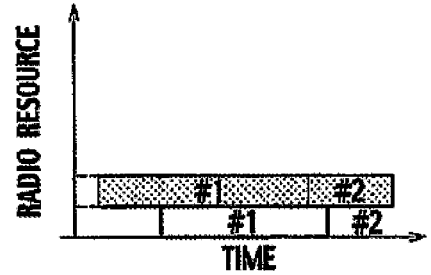
Figure 2C:
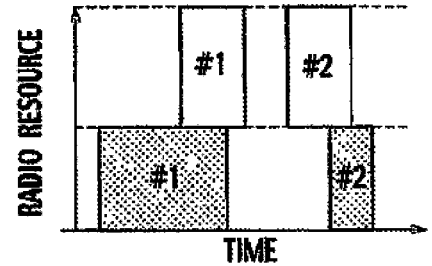
Figure 3:
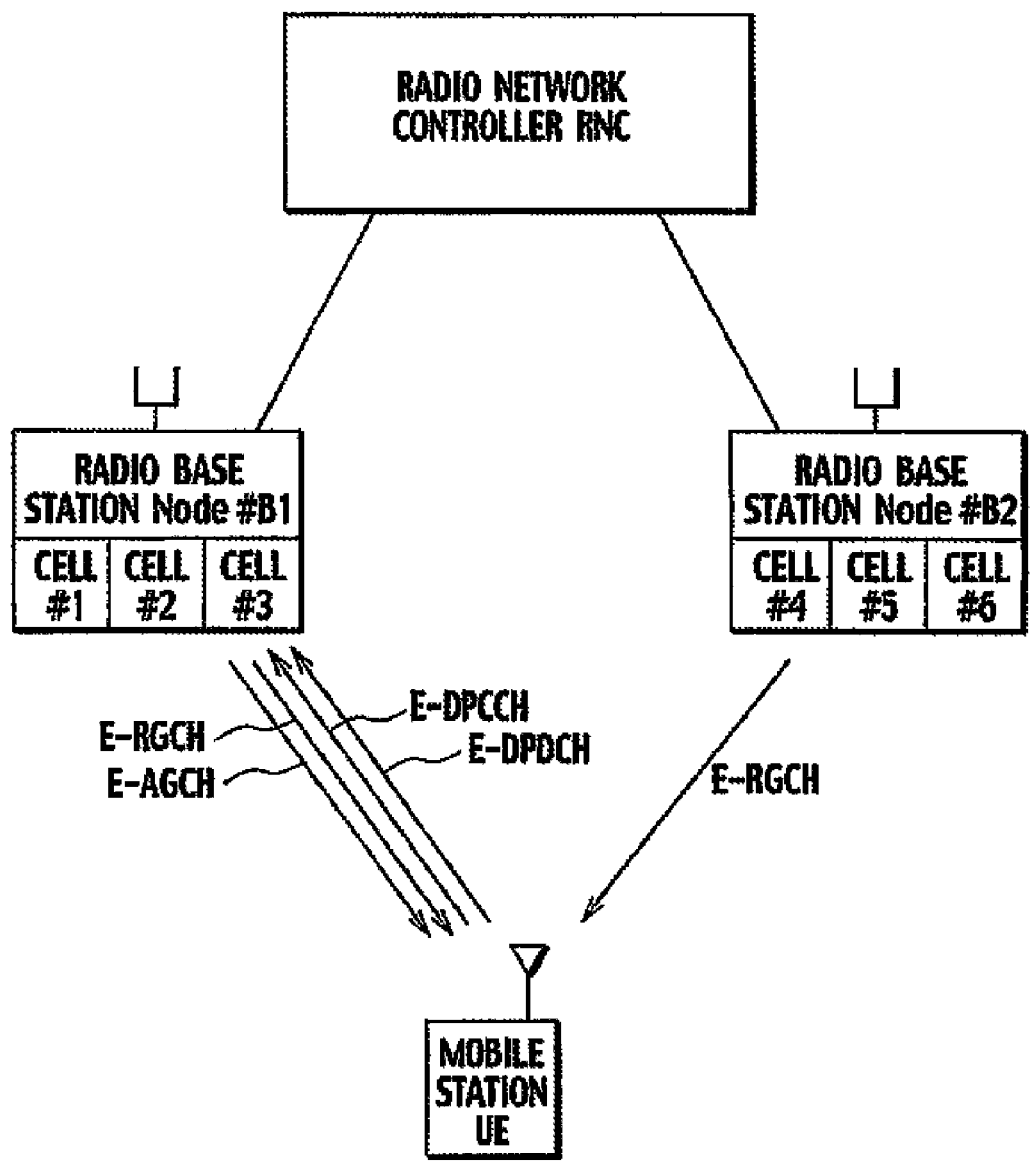
FIG. 3 is a diagram of an entire configuration of the conventional mobile communication system.
Figure 4:
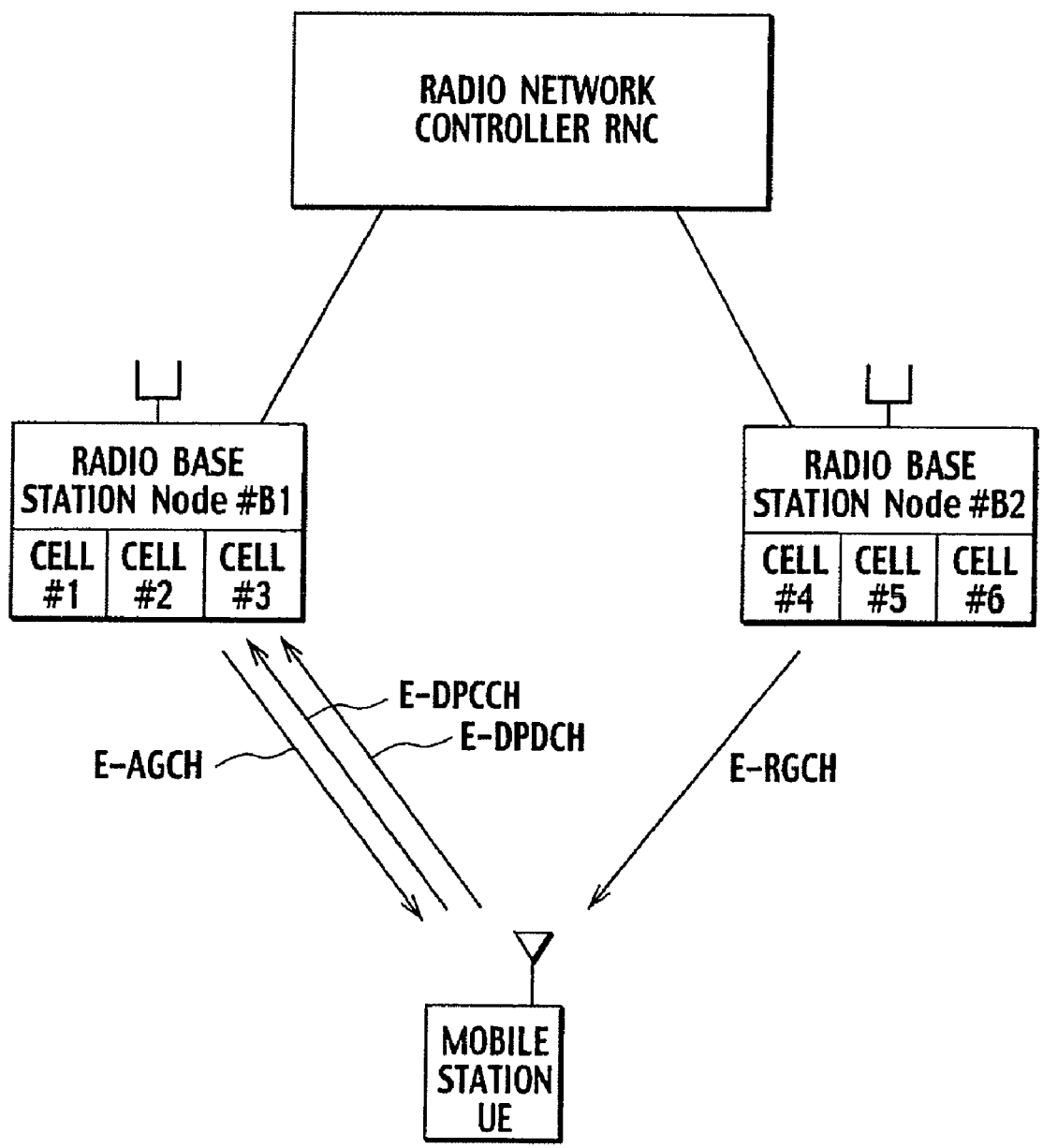
FIG. 4 is diagram of an entire configuration of a mobile communication system according to a first embodiment of the present invention.

In FIG. 4, the cell #3 controlled by the radio base station Node B #1 is a serving cell, which mainly controls the transmission rate of uplink user data transmitted by the mobile station UE. The cell #4 controlled by the radio base station Node B #2 is a non-serving cell, which sets a radio link with the mobile station UE as well as the serving cell.

In the above case, the cell #3 (the serving cell for the mobile station UE) is configured to transmit, to the mobile station UE, an "Enhanced Absolute Grant Channel (E-AGCH)". Further, the mobile station UE is configured to transmit an "Enhanced Dedicated Physical Control Channel (E-DPCCH)" and an "Enhanced Dedicated Physical Data Channel (E-DPDCH)" to the cell #3 (the serving cell for the mobile station UE).

However, it should be noted that in the mobile communication system according to this embodiment, the cell #3 (the serving cell for the mobile station UE) is configured to not to transmit the E-RGCH to the mobile station UE, if the radio network controller RNC notifies, to the mobile station UE, information for identifying the E-AGCH to be transmitted by the cell #3 (the serving cell for the mobile station UE) and does not notify, to the mobile station UE, information for identifying the E-RGCH to be transmitted by the cell #3 (the serving cell for the mobile station UE), when the mobile station UE establishes a data connection (Dedicated Channel (DCH), E-DPDCH) for transmitting uplink user data.

On the other hand, in the above case, the cell #4 (the non-serving cell for the mobile station UE) is configured to transmit the E-RGCH to the mobile station UE.

Figure 5:
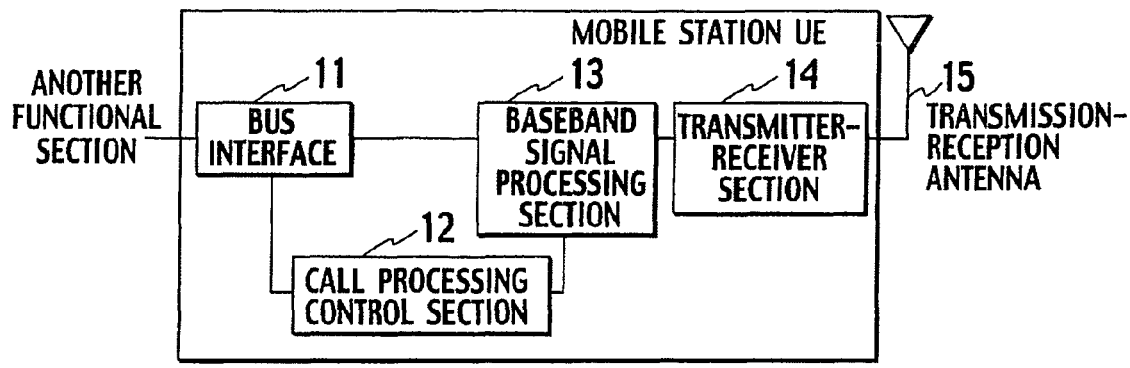
FIG. 5 is a functional block diagram of a mobile station in the mobile communication system according to the first embodiment of the present invention.

An example of general configuration of a mobile station UE according to this embodiment is shown in FIG. 5.

As shown in FIG. 5, the mobile station UE is provided with a bus interface 11, a call processing control section 12, a baseband signal processing section 13, a transmitter-receiver section 14, and a transmission-reception antenna 15. In addition, the mobile station UE can be configured to include an amplifier section (not shown in FIG. 5).

However, these functions do not have to be independently present as hardware. That is, these functions can be partly or entirely integrated, or can be configured through a process of software.

Figure 6:
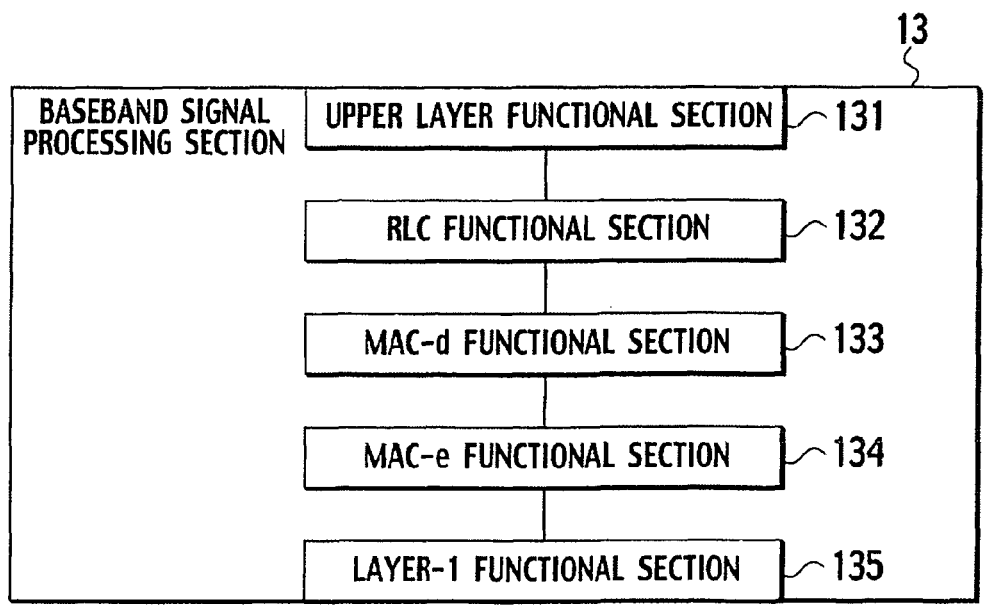
FIG. 6 is a functional block diagram of a baseband signal processing section of the mobile station in the mobile communication system according to the first embodiment of the present invention.

In FIG. 6, a functional block of the baseband signal processing section 13 is shown.

As shown in FIG. 6, the baseband signal processing section 13 is provided with an upper layer functional section 131, a RLC functional section 132, a MAC-d functional section 133, a MAC-e functional section 134, and a layer-1 functional section 135.

The RLC functional section 132 is configured to work as a RLC sublayer. The layer-1 functional section 135 is configured to work as a layer-1.

Figure 7:
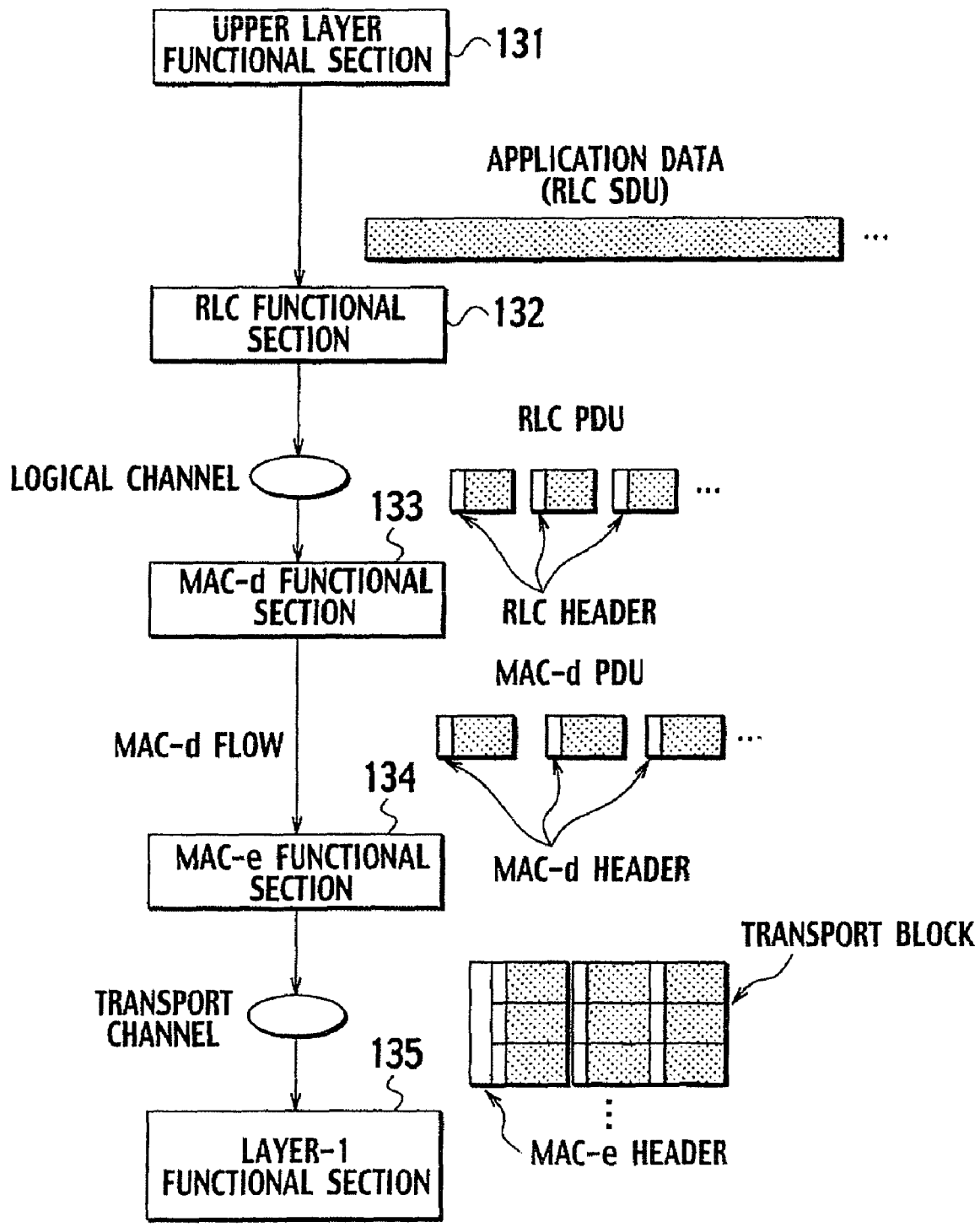
FIG. 7 is a diagram for explaining functions of the baseband signal processing section of the mobile station in the mobile communication system according to the first embodiment of the present invention.

As shown in FIG. 7, the RLC functional section 132 is configured to divide an application data (RLC SDU), which is received from the upper layer functional section 131, into PDUs of a predetermined PDU size. Then, the RLC functional section 132 is configured to generate RLC PDUs by adding a RLC header used for a sequence control processing, retransmission processing, and the like, so as to pass the RLC PDUs to the MAC-d functional section 133.

Here, a pipeline works as a bridge between the RLC functional section 132 and the MAC-d functional section 133 is a "logical channel". The logical channel is classified based on the contents of data to be transmitted/received, and when a communication is performed, it is possible to establish a plurality of logical channels in one connection. In other words, when the communication is performed, it is possible to transmit/receive a plurality of data with different contents (for example, control data and user data, or the like) logically in parallel.

The MAC-d functional section 133 is configured to multiplex the logical channels, and to add a MAC-d header associated with the multiplex of the logical channels, so as to generate a MAC-d PDU. A plurality of MAC-d PDUs are transferred from the MAC-d functional section 133 to the MAC-e functional section 134 as MAC-d flow.

The MAC-e functional section 134 is configured to assemble a plurality of MAC-d PDUs which are received from the MAC-d functional section 133 as MAC-d flow, and to add a MAC-e header to the assembled MAC-d PDU, so as to generate a transport block. Then, the MAC-e functional section 134 is configured to pass the generated transport block to the layer-1 functional section 135 through a transport channel.

In addition, the MAC-e functional section 134 is configured to work as a lower layer of the MAC-d functional section 133, and to implement the retransmission control function according to Hybrid ARQ (HARQ) and the transmission rate control function.

Figure 8:
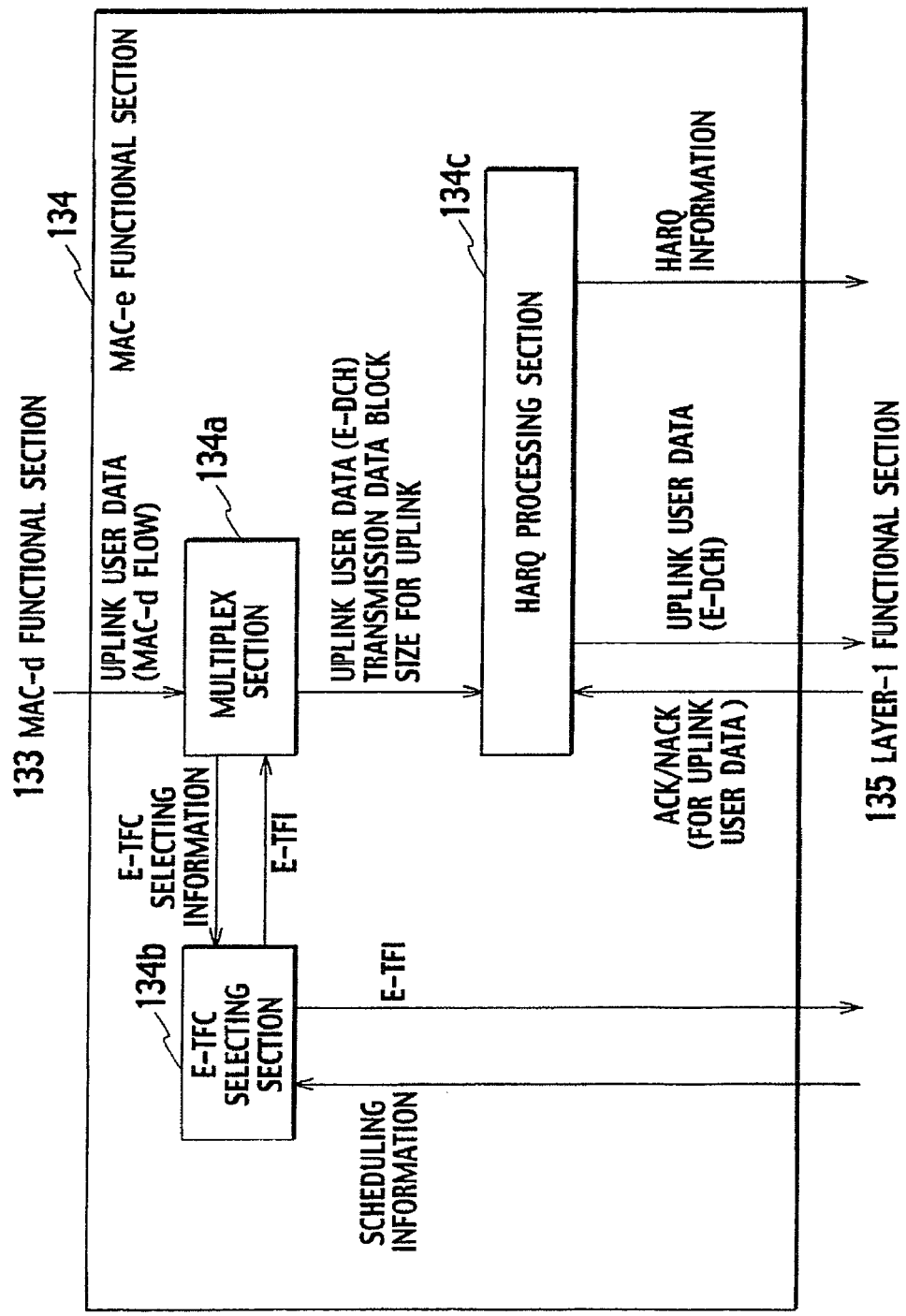
FIG. 8 is a functional block diagram of a MAC-e functional section in the baseband signal processing section of the mobile station in the mobile communication system according to the first embodiment of the present invention.

Specifically, as shown in FIG. 8, the MAC-e functional section 134 is provided with a multiplex section 134a, an E-TFC selecting section 134b, and an HARQ processing section 134c.

The multiplex section 134a is configured to perform a multiplex processing to the uplink user data, which is received from the MAC-d functional section 133 as MAC-d flow, based on a "Enhanced—Transport Format Indicator (E-TFI)" notified from the E-TFC selecting section 134b, so as to generate uplink user data (a Transport Block) to be transmitted via a transport channel (E-DCH). Then, the multiplex section 134a is configured to transmit the generated uplink user data (Transport Block) to the HARQ processing section 134c.

Hereinafter, the uplink user data received as MAC-d flow is indicated as the "uplink user data (MAC-d flow)", and the uplink user data to be transmitted via the transport channel (E-DCH) is indicated as the "uplink user data (E-DCH)".

The E-TFI is an identifier of a transport format, which is a format for providing the transport block on the transport channel (E-DCH) per TTI, and the E-TFI is added to the MAC-e header.

The multiplex section 134a is configured to determine a transmission data block size to be applied for the uplink user data based on the E-TFI notified from the E-TFC selecting section 134b, and to notify the determined transmission data block size to the HARQ processing section 134c.

In addition, when the multiplex section 134a receives the uplink user data from the MAC-d functional section 133 as MAC-d flow, the multiplex section 134a is configured to notify, to the E-TFC selecting section 134b, E-TFC selecting information for selecting a transport format for the received uplink user data.

Here, the E-TFC selecting information includes data size and priority class of the uplink user data, or the like.

Figure 9:
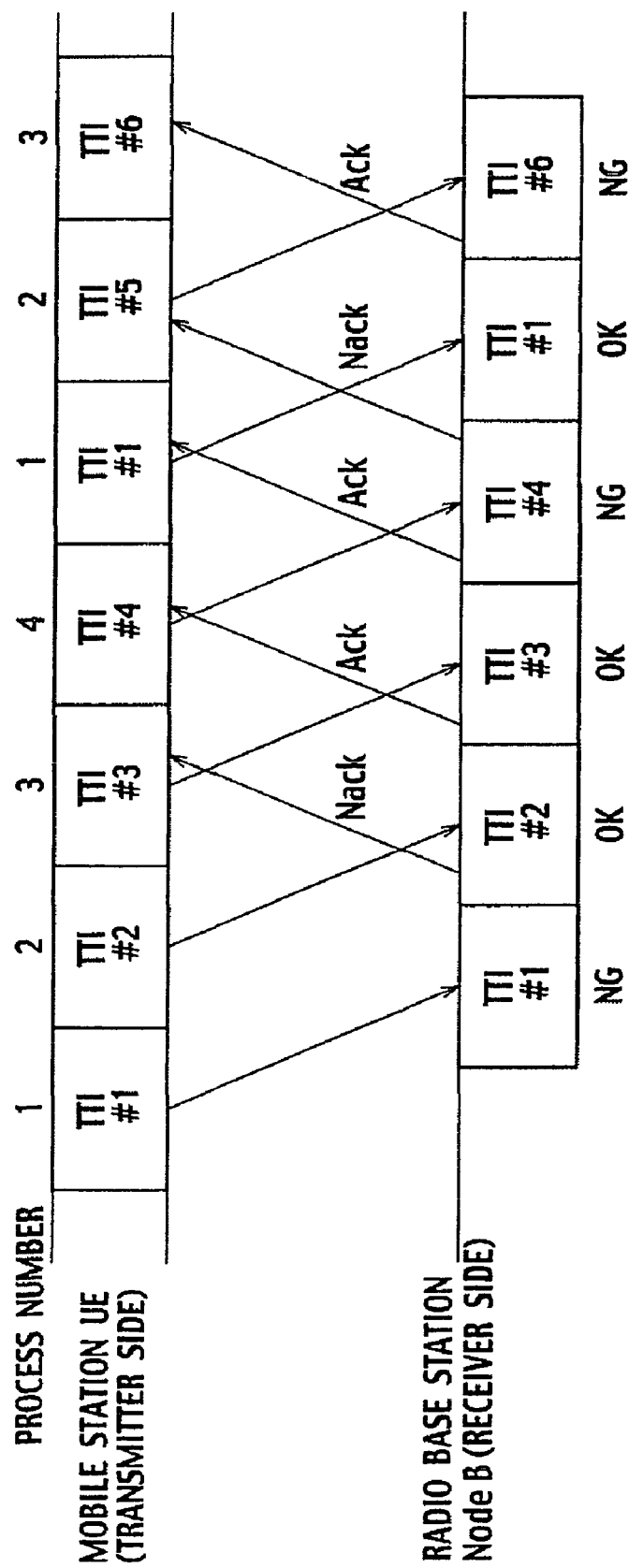
FIG. 9 is a graph illustrating an operation of four channel stop and wait protocol performed by an HARQ processing section in the MAC-e finctional section in the baseband signal processing section of the mobile station in the mobile communication system according to the first embodiment of the present invention.

The HARQ processing section 134c is configured to perform the retransmission control processing for the "uplink user data (E-DCH)" according to the "N channel stop and wait (N-SAW) protocol", based on ACK/NACK for the uplink user data notified from the layer-1 functional section 135. An example for operations of the "4 channel stop and wait protocol" is shown in FIG. 9.

In addition, the HARQ processing section 134c is configured to transmit, to the layer-1 functional section 135, the "uplink user data (E-DCH)" received from the multiplex section 134a, and HARQ information (for example, a number for retransmission, and the like) used for the HARQ processing.

The E-TFC selecting section 134b is configured to determine the transmission rate of the uplink user data by selecting the transport format (E-TF) to be applied to the "uplink user data (E-DCH)".

Specifically, the E-TFC selecting section 134b is configured to determine whether the transmission of the uplink user data should be performed or stopped, based on scheduling information, the amount of data in MAC-d PDU, the condition of hardware resource of the radio base station Node B, and the like.

The scheduling information (such as absolute transmission rate and a relative transmission rate of the uplink user data) is received from the radio base station Node B, the amount of data in MAC-d PDU (such as data size of the uplink user data) is passed from the MAC-d functional section 133, and the condition of hardware resource of the radio base station Node B is controlled in the MAC-e functional section 134.

Then, the E-TFC selection section 134b is configured to select the transport format (E-TF) to be applied to transmission of the uplink user data, and to notify the E-TFI for identifying the selected transport format to the layer-1 functional section 135 and the multiplex section 134a.

For example, the E-TFC selecting section 134b is configured to store the transmission rate of uplink user data in association with the transport format, to update the transmission rate of uplink user data based on the scheduling information from the layer-1 functional section 135, and to notify, to the layer-1 functional section 135 and the multiplex section 134a, the E-TFI for identifying the transport format which is associated with the updated transmission rate of uplink user data.

Here, when the E-TFC selecting section 134b receives the absolute transmission rate of the uplink user data from the serving cell for the mobile station via the E-AGCH as the scheduling information, the E-TFC selecting section 134b is configured to change the transmission rate of the uplink user data to the received absolute transmission rate of the uplink user data.

In addition, when the E-TFC selecting section 134b receives the relative transmission rate of the uplink user data (Down command or Don't care command) from the non-serving cell for the mobile station via the E-RGCH as the scheduling information, the E-TFC selecting section 134b is configured to increase/decrease the transmission rate of the uplink user data, at the timing of receiving the relative transmission rate, by the predetermined rate based on the relative transmission rate of the uplink user data.

In this specification, the transmission rate of the uplink user data can be a rate which can transmit an uplink user data via an "Enhanced Dedicated Physical Data Channel (E-DPD CH)", a transmission data block size (TBS) for transmitting an uplink user data, a transmission power of an "E-DPDCH", or a transmission power ratio (a transmission power offset) between an "E-DPDCH" and a "Dedicated Physical Control Channel (DPCCH)".

Figure 10:
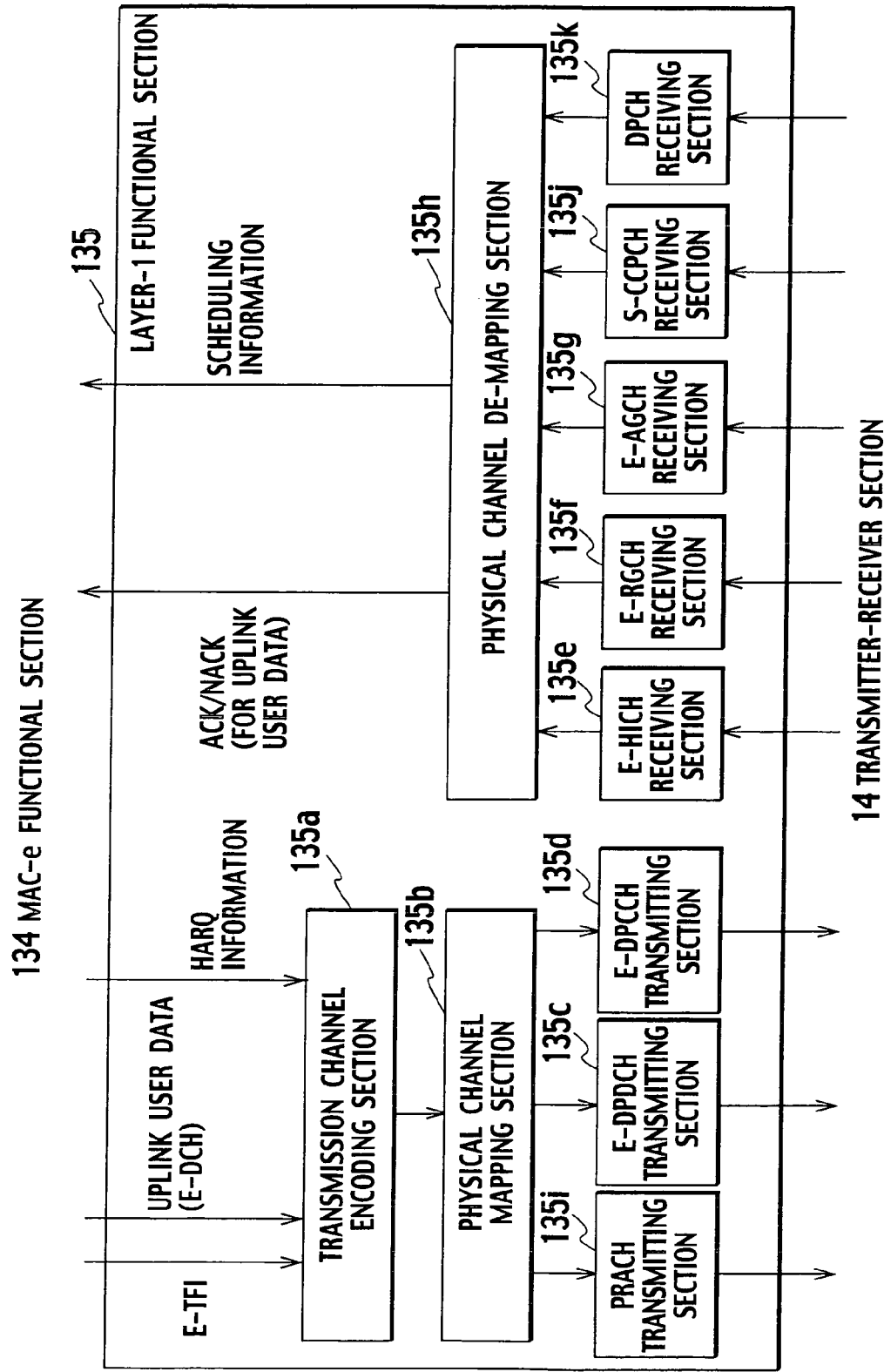
FIG. 10 is a functional block diagram of a layer-1 functional section in the baseband signal processing section of the mobile station in the mobile communication system according to the first embodiment of the present invention.

As shown in FIG. 10, the layer-1 functional section 135 is provided with a transmission channel encoding section 135a, a physical channel mapping section 135b, an E-DPDCH transmitting section 135c, an E-DPCCH transmitting section 135d, an E-HICH receiving section 135e, an E-RGCH receiving section 135f, an E-AGCH receiving section 135g, a physical channel de-mapping section 135h, a PRACH transmitting section 135i, a S-CCPCH receiving section 135j, and a DPCH receiving section 135k.

Figure 11:
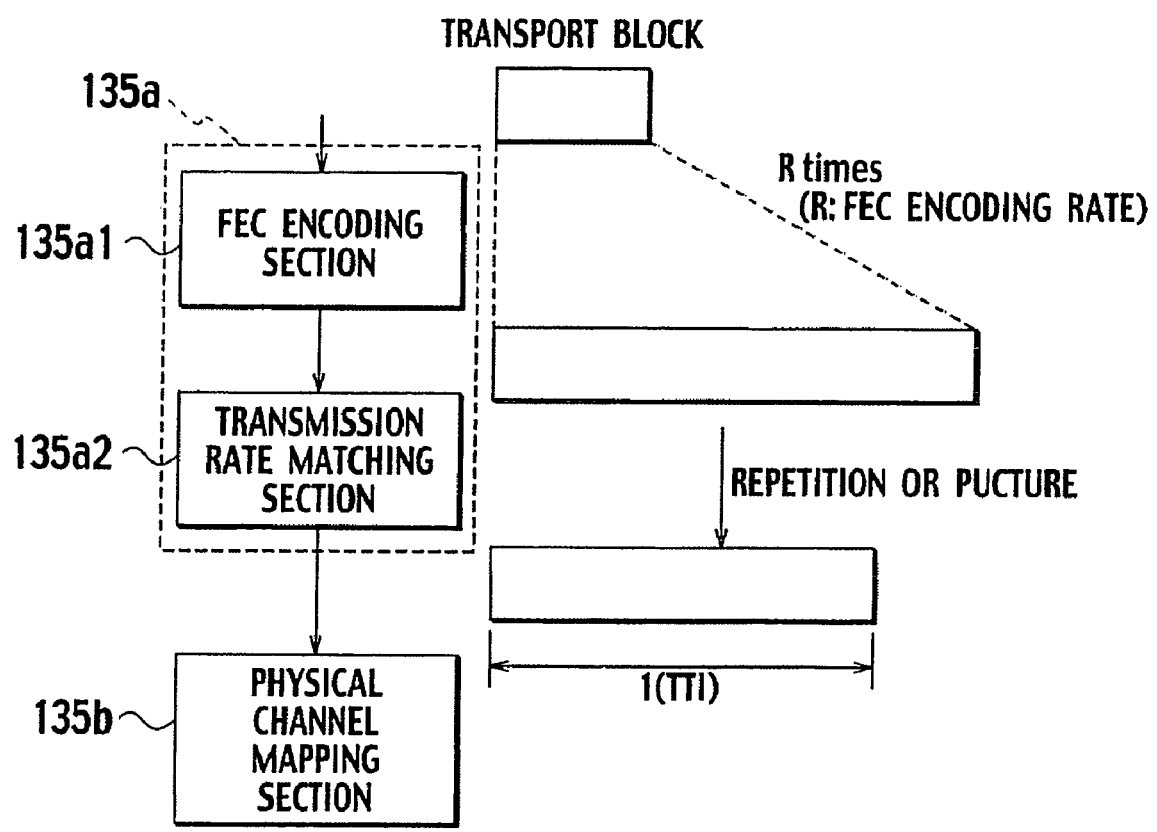
FIG. 11 is a diagram for explaining functions of the layer-1 functional section in the baseband signal processing section of the mobile station in the mobile communication system according to the first embodiment of the present invention.

As shown in FIG. 11, the transmission channel encoding section 135a is provided with a FEC (Forward Error Collection) encoding section 135a1, and a transmission rate matching section 135a2.

As shown in FIG. 11, the FEC encoding section 135a1 is configured to perform the error correction encoding processing toward the "uplink user data (E-DCH)", that is, the transport block, transmitted from the MAC-e functional section 134.

In addition, as shown in FIG. 11, the transmission rate matching section 135a2 is configured to perform, toward the transport block to which the error correction encoding processing is performed, the processing of "repetition (repeat of bit)" and "puncture (bit skipping)" in order to match to the transmission capacity in the physical channel.

The physical channel mapping section 135b is configured to pair the "uplink user data (E-DCH)" from the transmission channel encoding section 135a with the E-DPDCH, and to pair the E-TFI and the HARQ information from the transmission channel encoding section 135a with the E-DPCCH.

The E-DPDCH transmitting section 135c is configured to perform a transmission processing of the E-DPDCH.

The E-DPCCH transmitting section 135d is configured to perform a transmission processing of the E-DPCCH.

The PRACH transmitting section 135i is configured to perform a transmission processing of a "Physical Random Access Channel (PRACH)" via which a call request is transmitted. Here, the call request requests to establish a data connection (DCH, E-DPDCH) for transmitting the uplink user data to the mobile station UE.

In addition, the PRACH transmitting section 135i is configured to perform a transmission of the PRACH via which a "control connection setup response" is transmitted. Here, the control connection setup response notifies that a control connection (DCCH: Dedicated Control Channel) for transmitting control information to the mobile station UE has been established.

The E-HICH receiving section 135e is configured to receive an "E-DCH HARQ Acknowledgement Indicator Channel (E-HICH)" transmitted from the radio base station Node B.

The E-RGCH receiving section 135f is configured to receive the E-RGCH transmitted from the radio base station Node B (the serving cell and the non-serving cell for the mobile station UE).

The E-AGCH receiving section 135g is configured to receive the E-AGCCH transmitted from the radio base station Node B (the serving cell for the mobile station UE).

However, the E-RGCH receiving section 135f can be configured not to perform the receiving processing of the E-RGCH transmitted from the serving cell, when the information for identifying the E-RGCH (channelization codes, sequence patterns, and the like) which is transmitted by the serving cell is not notified from the radio network controller RNC, and the information for identifying the E-AGCH (channelization codes, sequence patterns, and the like) which is transmitted by the serving cell is notified from the radio network controller RNC, and when the mobile station UE establishes the data connection (DCH, E-DPDCH) for transmitting the uplink user data.

The S-CCPCH receiving section 135j is configured to receive a "Secondary Common Control Physical Channel (S-CCPCH)" transmitted from the radio base station Node B.

The DPCH receiving section 135k is configured to receive the DPCH transmitted from the radio base station Node B.

The physical channel de-mapping section 135h is configured to extract the ACK/NACK for the uplink user data which is included in the E-HICH received by the E-HICH receiving section 135e, so as to transmit the extracted ACK/NACK for the uplink user data to the MAC-e functional section 134.

In addition, the physical channel de-mapping section 135h is configured to extract the scheduling information (the relative transmission rate of the uplink user data, that is, UP command/DOWN command) which is included in the E-RGCH received by the E-RGCH receiving section 135f, so as to transmit the extracted scheduling information to the MAC-e functional section 134.

In addition, the physical channel de-mapping section 135h is configured to extract the scheduling information (the absolute transmission rate of the uplink user data) which is included in the E-AGCH received by the E-AGCH receiving section 135g, so as to transmit the extracted scheduling information to the MAC-e functional section 134.

Figure 12:
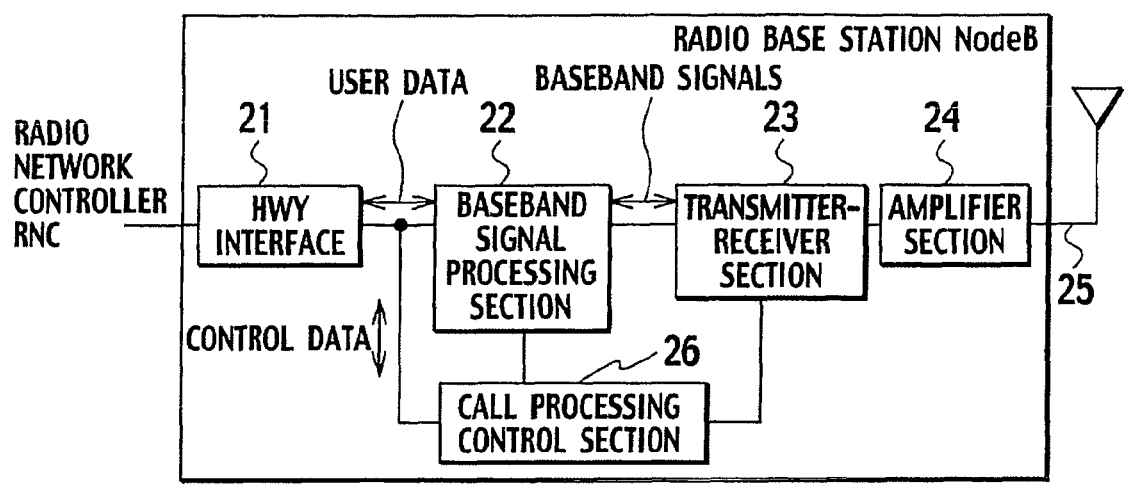
FIG. 12 is a functional block diagram of a radio base station according to the first embodiment of the present invention.

FIG. 12 shows an example of a configuration of functional blocks of a radio base station Node B according to this embodiment.

As shown in FIG. 12, the radio base station Node B according to this embodiment is provided with an HWY interface 21, a baseband signal processing section 22, a transmitter-receiver section 23, an amplifier section 24, a transmission-reception antenna 25, and a call processing control section 26.

The HWY interface 21 is configured to receive downlink user data to be transmitted from the radio network controller RNC, which is located in an upper level of the radio base station Node B, so as to enter the received downlink user data to the baseband signal processing section 22.

In addition, the HWY interface 21 is configured to transmit uplink user data from the baseband signal processing section 22 to the radio network controller RNC.

The baseband signal processing section 22 is configured perform the layer-1 processing such as channel encoding processing, spreading processing, and the like, to the downlink user data, so as to transmit the baseband signal including the downlink user data to the transmitter-receiver section 23.

In addition, the baseband signal processing section 22 is configured to perform the layer-1 processing such as despreading processing, RAKE combining processing, error correction decoding processing, and the like, to the baseband signal, which is acquired from the transmitter-receiver section 23, so as to transmit the acquired uplink user data to the HWY interface 21.

The transmitter-receiver section 23 is configured to convert the baseband signal, which is acquired from the baseband signal processing section 22, to radio frequency signals.

In addition, the transmitter-receiver section 23 is configured to convert the radio frequency signals, which are acquired from the amplifier section 24, to the baseband signals.

The amplifier section 24 is configured to amplify the radio frequency signals acquired from the transmitter-receiver section 23, so as to transmit the amplified radio frequency signals to the mobile station UE via the transmission-reception antenna 25.

In addition, the amplifier section 24 is configured to amplify the signals received by the transmission-reception antenna 25, so as to transmit the amplified signals to the transmitter-receiver section 23.

The call processing control section 26 is configured to transmit/receive the call processing control signals to/from the radio network controller RNC, and to perform the processing of condition control of each function in the radio base station Node B, allocating hardware resource in layer-3, and the like.

Figure 13:
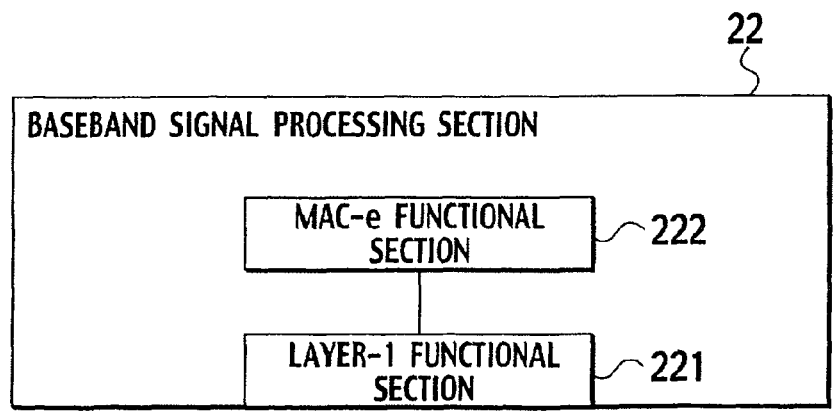
FIG. 13 is a functional block diagram of a baseband signal processing section in the radio base station of the mobile communication system according to the first embodiment of the present invention.

FIG. 13 is a functional block diagram of the baseband signal processing section 22.

As shown in FIG. 13, the baseband signal processing section 22 is provided with a layer-1 functional section 221, and a MAC-e functional section 222.

Figure 14:
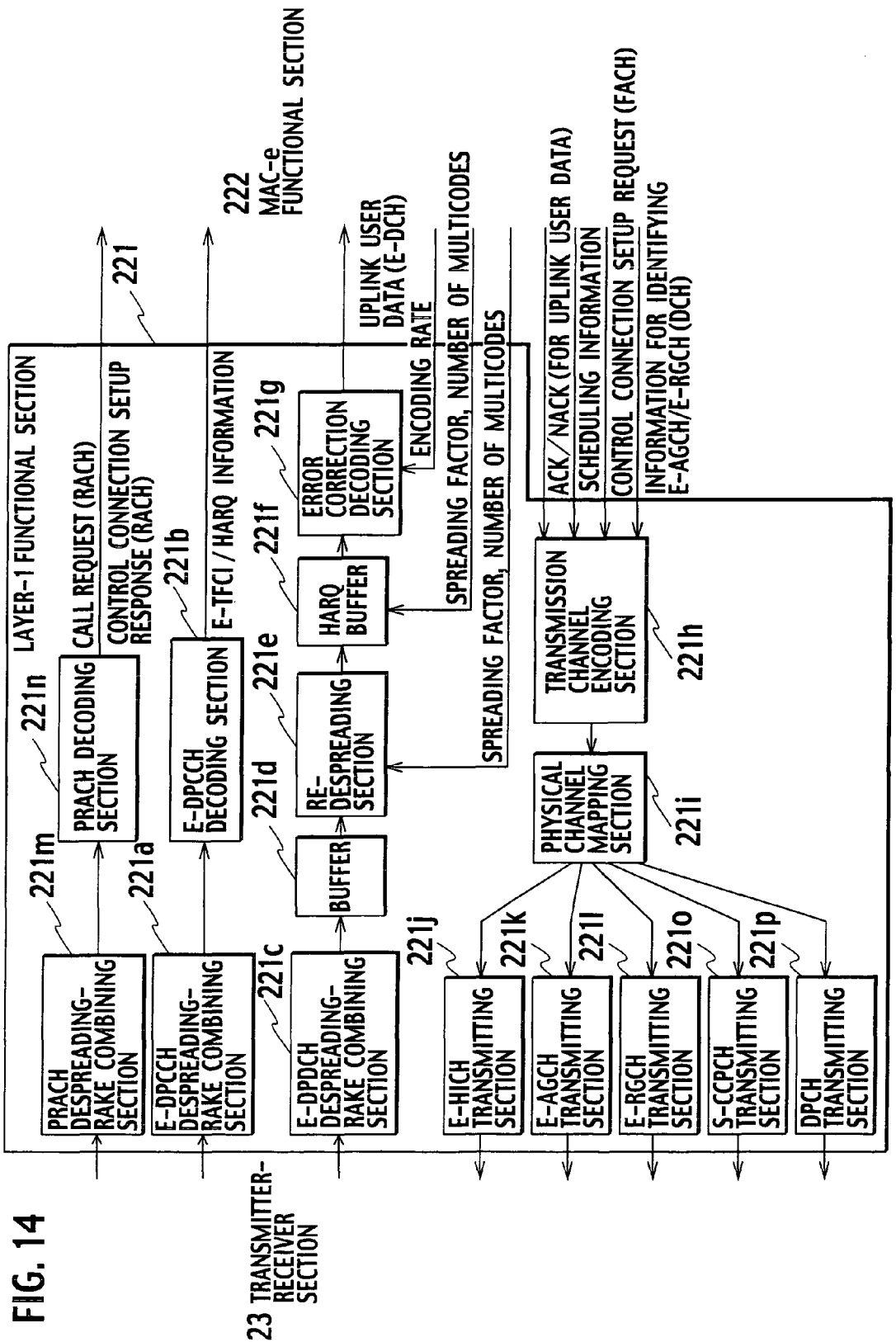
FIG. 14 is a functional block diagram of a layer-1 functional section in the baseband signal processing section in the radio base station of the mobile communication system according to the first embodiment of the present invention.

As shown in FIG. 14, the layer-1 functional section 221 is provided with an E-DPCCH despreading-RAKE combining section 221a, an E-DPCCH decoding section 221b, an E-DPDCH despreading-RAKE combining section 221c, a buffer 221d, a re-despreading section 221e, an HARQ buffer 221f, an error correction decoding section 221g, a transmission channel encoding section 221h, a physical channel mapping section 221i, an E-HICH transmitting section 221j, an E-AGCH transmitting section 221k, an E-RGCH transmitting section 221l, a PRACH despreading-RAKE combining section 221m, a PRACH decoding section 221n, a S-CCPCH transmitting section 221o, and a DPCH transmitting section 221p.

However, these functions do not have to be independently present as hardware. That is, these functions can be partly or entirely integrated, or can be configured through a process of software.

The E-DPCCH despreading-RAKE combining section 221a is configured to perform the despreading processing and RAKE combining processing to the E-DPCCH.

The E-DPCCH decoding section 221b is configured to decode the E-TFCI for determining the transmission rate of the uplink user data (or an "Enhanced Transport Format and Resource Indicator (E-TFRI)" based on the output from the E-DPCCH despreading-RAKE combining section 221a, so as to transmit the decoded E-TFCI to the MAC-e functional section 222.

The E-DPDCH despreading-RAKE combining section 221c is configured to perform the despreading processing to the E-DPDCH using the spreading factor (the minimum spreading factor) and the number of multi-codes which correspond to the maximum rate that the E-DPDCH can use, so as to store the despread data to the buffer 221d. By performing the despreading processing using the above described spreading factor and the number of multi-codes, it is possible for the radio base station Node B to reserve the resources so that the radio base station Node B can receive the uplink data up to the maximum rate (bit rate) that the mobile station UE can use.

The re-despreading section 221e is configured to perform the re-despreading processing to the data stored in the buffer 221d using the spreading factor and the number of multi-codes which are notified from the MAC-e functional section 222, so as to store the re-despread data to the HARQ buffer 221f.

The error correction decoding section 221g is configured to perform the error correction decoding processing to the data stored in the buffer 221d based on the coding rate which is notified from the MAC-e functional section 222, so as to transmit the acquired "uplink user data (E-DCH)" to the MAC-e functional section 222.

The PRACH despreading-RAKE combining section 221m is configured to perform the despreading processing and RAKE combining processing to the PRACH.

In addition, the PRACH decoding section 221n is configured to decode the call request or the control connection setup response, which are transmitted from the mobile station UE, based on the output from the PRACH despreading-RAKE combining section 221m, so as to transmit the decoded call request or control connection setup response to the MAC-e functional section 222 via a "Random Access Channel (RACH)".

The transmission channel encoding section 221h is configured to perform the necessary encoding processing to the ACK/NACK and the scheduling information for the uplink user data received from the MAC-e functional section 222.

The physical channel mapping section 221i is configured to pair the ACK/NACK for the uplink user data, which is acquired from the transmission channel encoding section 221h, with the E-HICH, to pair the scheduling information (absolute transmission rate), which is acquired from the transmission channel encoding section 221h, with the E-AGCH, and to pair the scheduling information (relative transmission rate), which is acquired from the transmission channel encoding section 221h, with the E-RGCH.

In addition, the physical channel mapping section 221i is configured to pair a control connection setup request, which requests to establish a control connection for transmitting the control information to the mobile station UE, with the S-CCPCH.

In addition, the physical channel mapping section 221i is configured to pair the information for identifying the E-AGCH to be transmitted to the mobile station UE (channelization codes, sequence patterns, and the like) and the information for identifying the E-RGCH to be transmitted to the mobile station UE (channelization codes, sequence patterns, and the like) with the DPCH (DPCCH or DPDCH).

Here, the physical channel mapping section 221i in the serving cell for the mobile station UE is configured not to pair the information for identifying the E-RGCH to be transmitted to the mobile station UE with the DPCH (DPCCH or DPDCH) based on the instruction from the radio network controller RNC.

The E-HICH transmitting section 221j is configured to perform the transmission processing of the E-HICH.

The E-AGCH transmitting section 221k is configured to perform the transmission processing of the E-AGCH.

The E-RGCH transmitting section 221l is configured to perform the transmission processing of the E-RGCH.

The S-CCPCH transmitting section 221o is configured to perform the transmission processing of the S-CCPCH.

The DPCH transmitting section 221p is configured to perform the transmission processing of the DPCH.

Figure 15:
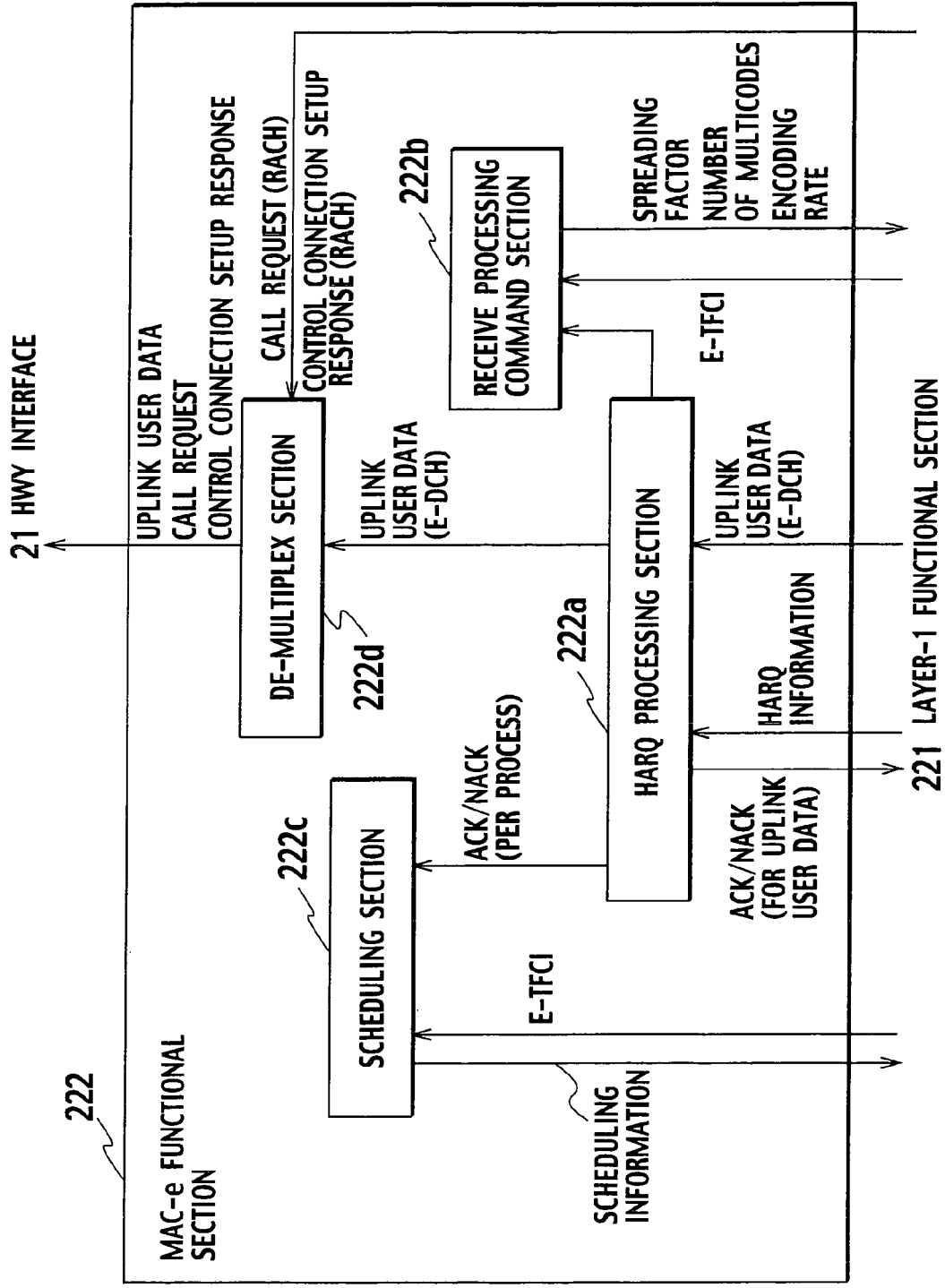
FIG. 15 is a functional block diagram of a MAC-e functional section in the baseband signal processing section in the radio base station of the communication system according to the first embodiment of the present invention.

As shown in FIG. 15, the MAC-e functional section 222 is provided with an HARQ processing section 222a, a receive processing command section 222b, a scheduling section 222c, a de-multiplex section 222d.

The HARQ processing section 222a is configured to receive the uplink user data and the HARQ information which are received from the layer-1 functional section 221, so as to perform the HARQ processing on the "uplink user data (E-DCH)".

In addition, the HARQ processing section 222a is configured to notify, to the layer-1 functional section 221, the ACK/NACK (for the uplink user data) which shows the result of receive processing on the "uplink user data (E-DCH)".

In addition, the HARQ processing section 222*a* is configured to notify, to the scheduling section 222*c*, the ACK/NACK (for the uplink user data) per process.

The receive processing command section 222*b* is configured to notify, to the re-despreading section 221*e* and the HARQ buffer 221*f*, the spreading factor and the number of multi-codes for the transport format of each mobile station UE, which is specified by the E-TFCI per TTI received from the E-DPCCH decoding section 221*b* in the layer-1 functional section 221. Then, the receive processing command section 222*b* is configured to notify the encoding rate to the error correction decoding section 221*g*.

The scheduling section 222*c* is configured to change the absolute transmission rate or the relative transmission rate of the uplink user data, based on the E-TFCI per TTI received from the E-DPCCH decoding section 221 in the layer-1 functional section 221, the ACK/NACK per process received from the HARQ processing section 222*a*, the interference level, and the like.

In addition, the scheduling section 222*c* is configured to notify, to the layer-1 functional section 221, the absolute transmission rate or the relative transmission rate of the uplink user data, as the scheduling information.

The de-multiplex section 222*d* is configured to perform the de-multiplex processing to the "uplink user data (E-DCH)" received from the HARQ processing section 222*a*, so as to transmit the acquired uplink user data to the HWY interface 21.

In addition, the de-multiplex section 222*d* is configured to perform the de-multiplex processing to the call request (RACH) and the control connection setup response (E-DPDCH) which are received from the layer-1 functional section 221, so as to transmit the acquired result of de-multiplex processing to the HWY interface 21.

The radio network controller RNC according to this embodiment is an apparatus located in an upper level of the radio base station Node B, and is configured to control radio communications between the radio base station Node B and the mobile station UE.

Figure 16:
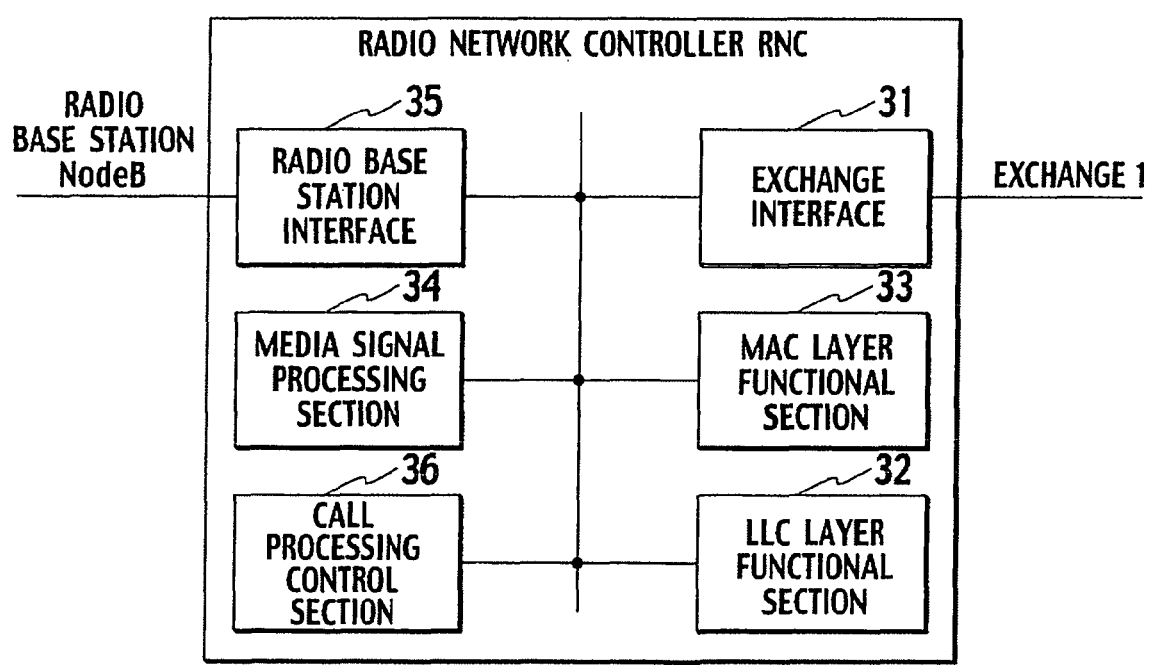
FIG. 16 is a functional block diagram of a radio network controller of the mobile communication system according to the first embodiment of the present invention.

As shown in FIG. 16, the radio network controller RNC according to this embodiment is provided with an exchange interface 31, a Logical Link Control (LLC) layer functional section 32, a MAC layer functional section 33, a media signal processing section 34, a radio base station interface 35, and a call processing control section 36.

The exchange interface 31 is an interface with an exchange 1, and is configured to forward the downlink signals transmitted from the exchange 1 to the LLC layer functional section 32, and to forward the uplink signals transmitted from the LLC layer functional section 32 to the exchange 1.

The LLC layer functional section 32 is configured to perform an LLC sub-layer processing such as a combining processing of a header or a trailer such as a sequence pattern number.

The LLC layer functional section 32 is also configured to transmit the uplink signals to the exchange interface 31 and to transmit the downlink signals to the MAC layer functional section 33, after the LLC sub-layer processing is performed.

The MAC layer functional section 33 is configured to perform a MAC layer processing such as a priority control processing or a header adding processing.

The MAC layer functional section 33 is also configured to transmit the uplink signals to the LLC layer functional section 32 and to transmit the downlink signals to the radio base station interface 35 (or the media signal processing section 34), after the MAC layer processing is performed.

The media signal processing section 34 is configured to perform a media signal processing against voice signals or real time image signals.

The media signal processing section 34 is also configured to transmit the uplink signals to the MAC layer functional section 33 and to transmit the downlink signals to the radio base station interface 35, after the media signal processing is performed.

The radio base station interface 35 is an interface with the radio base station Node B. The radio base station interface 35 is configured to forward the uplink signals transmitted from the radio base station Node B to the MAC layer functional section 33 (or the media signal processing section 34) and to forward the downlink signals transmitted from the MAC layer functional section 33 (or the media signal processing section 34) to the radio base station Node B.

The call processing control section 36 is configured to perform a radio resource control processing, a channel setup and release processing by the layer-3 signaling, or the like. Here, the radio resource control includes call admission control, handover control, or the like.

In addition, the call processing control section 36 is configured not to notify, to the mobile station UE, the information for identifying the E-RGCH to be transmitted by the serving cell, and to notify, to the mobile station UE, the information for identifying the E-AGCH to be transmitted by the serving cell, when the mobile station UE establishes a data connection (DCH, E-DPDCH) for transmitting the uplink user data.

(Operations of Mobile Communication System According to First Embodiment of the Present Invention)

Figure 17:
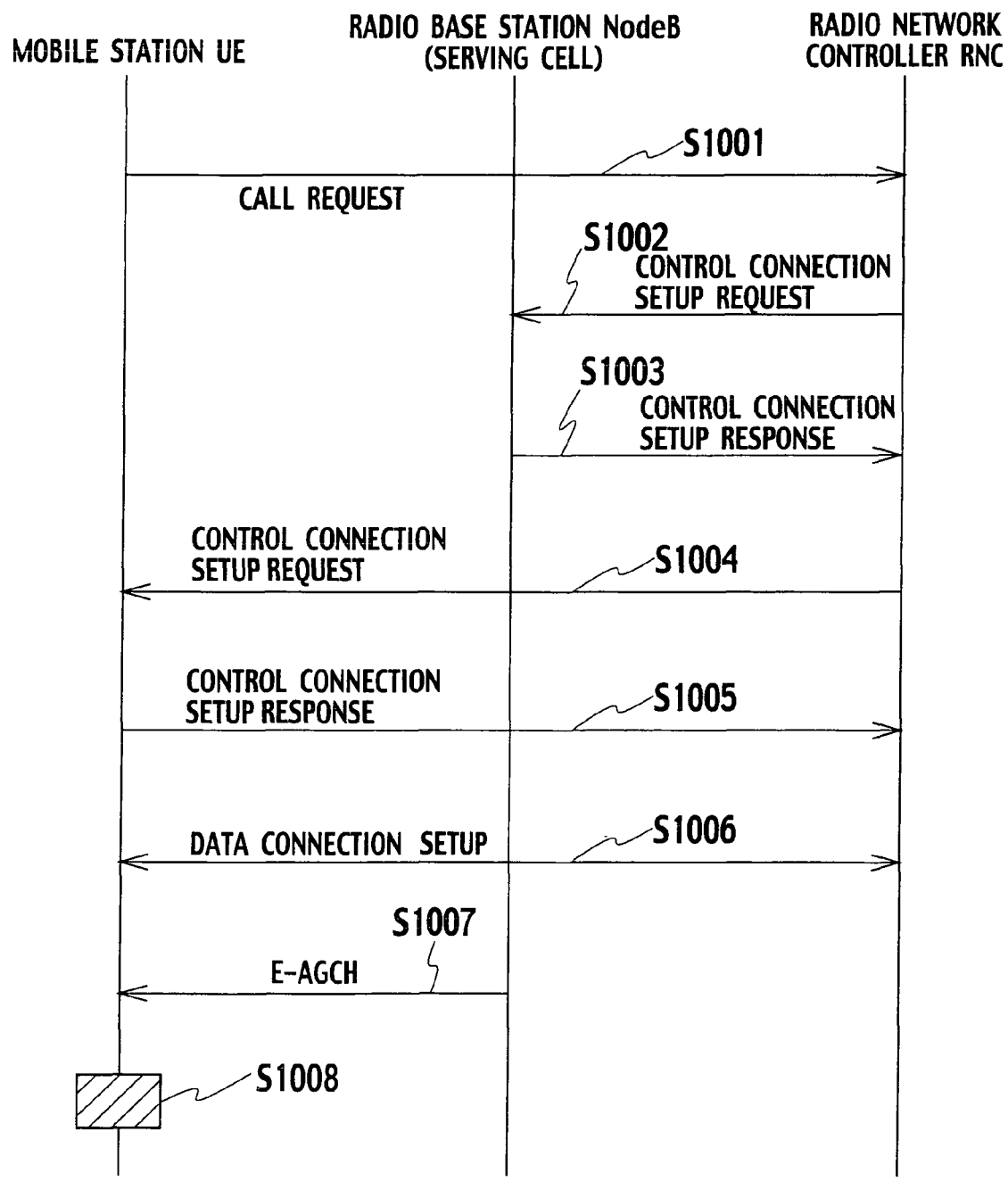
FIG. 17 is a sequence pattern diagram showing operations of transmission rate control method in the mobile communication system according to the first embodiment of the present invention.

Referring to FIG. 17, operations of the mobile communication system according to this embodiment will be described. Specifically, the operations of controlling the transmission rate of the uplink user data in the mobile communication system according to this embodiment will be described.

As shown in FIG. 17, in step S1001, the mobile station UE transmits a call request which requests to establish a data connection (DCH, E-DPDCH) for transmitting the uplink user data using the PRACH (RACH).

In step S1002, the radio network controller RNC transmits a connection setup request which requests to establish the at connection for the mobile station UE, to the radio base station Node B controlling the serving cell for the mobile station UE based on the received call request.

When the radio base station Node B determine that the data connection can be established with the mobile station UE, in step S1003, the radio base station Node B transmits a connection setup response to the radio network controller RNC.

In step S1004, the radio network controller RNC transmits a control connection setup request which requests to establish the control connection (DCH, DPCH) for transmitting the control information for the mobile station UE (such as information for identifying the E-AGCH, information for identifying the E-RGCH) to the mobile station UE using the S-CCPCH (FACH).

In step S1005, the mobile station UE transmits a control connection setup response to the radio network controller RNC using the PRACH (RACH), so as to notify that the setup of control connection is completed.

In step S1006, via the control connection, the data connection for transmitting the uplink user data is established.

Here, the radio network controller RNC does not notify, to the mobile station UE and the radio base station Node B, the information for identifying the E-RGCH to be transmitted by the serving cell, but notifies, to the mobile station UE and the radio base station Node B, the information for identifying the E-AGCH to be transmitted by the serving cell.

In step S1007, the serving cell controlled by the radio base station Node B does not transmit the E-RGCH, but transmits only the E-AGCH to the mobile station UE.

In step S1008, the mobile station UE controls the transmission rate of uplink user data, based on the absolute transmission rate of the uplink user data, which is transmitted by the serving cell for the mobile station UE controlled by the radio base station Node B, and the relative transmission rate of the uplink user data, which is transmitted by the non-serving cells (not shown in FIG. 17).

(Effects of Mobile Communication System According to First Embodiment of the Present invention)

According to the mobile communication system of this embodiment, the mobile station UE will not be notified the information for identifying the E-RGCH from the radio network controller RNC so that the mobile station UE will not detect the E-RGCH when the serving cell for the mobile station UE does not transmit the E-RGCH. Accordingly, it is possible to prevent the mobile station UE from detecting the E-RGCH erroneously, and to allocate radio resources more efficiently.

Further, according to the mobile communication system of this embodiment, the transmission of the E-AGCH and/or the E-RGCH for correcting the E-RGCH erroneously detected by the mobile station UE will not be required, and accordingly, it is possible to decrease the loads in radio downlink.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A transmission rate control method for controlling, at a mobile station, a transmission rate of uplink user data, in a radio communication system capable of controlling a transmission rate of uplink user data based on an absolute transmission rate of uplink user data, which is transmitted via an absolute transmission rate control channel and a relative transmission rate of uplink user data which is transmitted via a relative transmission rate control channel, comprising:

notifying, from a radio network controller to the mobile station, information for identifying the absolute transmission rate control channel to be transmitted from a serving cell, when the mobile station establishes a data connection for transmitting the uplink user data; and controlling, at the mobile station, the transmission rate of uplink user data, based on the absolute transmission rate of the uplink user data which is transmitted from the serving cell via the absolute transmission rate control channel, without considering the relative transmission rate of the uplink user data, regardless of whether or not the relative transmission rate control channel is transmitted, when the information for identifying the relative transmission rate control channel is not notified from the radio network controller.

2. The transmission rate control method according to claim 1, further comprising:

notifying, from the radio network controller to a radio base station which controls the serving cell, the information for identifying the absolute transmission rate control channel to be transmitted from the serving cell, and not notifying, from the radio network controller to the radio base station, the information for identifying the relative transmission rate control channel, when the mobile station establishes the data connection for transmitting the uplink user data; and transmitting, at the serving cell, the absolute transmission rate control channel to the mobile station, and not transmitting the relative transmission rate control channel to the mobile station.

3. A mobile station configured for use in a radio communication system capable of controlling a transmission rate of uplink user data based on an absolute transmission rate of uplink user data which is transmitted via an absolute transmission rate control channel and a relative transmission rate of uplink user data which is transmitted via a relative transmission rate control channel;

wherein the mobile station is configured to control the transmission rate of the uplink user data, based on the absolute transmission rate of the uplink user data which is transmitted from a serving cell for the mobile station via the absolute transmission rate control channel, without considering the relative transmission rate of the uplink user data regardless of whether or not the relative transmission rate control channel is transmitted, when information for identifying the absolute transmission rate control channel to be transmitted from the serving cell for the mobile station is notified and information for identifying the relative transmission rate control channel is not notified from a radio network controller, when the mobile station establishes a data connection for transmitting uplink user data.

4. A radio base station configured for use in a mobile communication system capable of controlling, at a mobile station, a transmission rate of uplink user data, based on an absolute transmission rate of uplink user data which is transmitted via an absolute transmission rate control channel and a relative transmission rate of uplink user data which is transmitted via a relative transmission rate control channel;

wherein a serving cell for the mobile station which is controlled by the radio base station is configured to transmit, to the mobile station, the absolute transmission rate control channel, and not to transmit, to the mobile station, the relative transmission rate control channel, when information for identifying the absolute transmission rate control channel to be transmitted by the serving cell is notified and information for identifying the relative transmission rate control channel is not notified; and when the mobile station establishes a data connection for transmitting uplink user data, the mobile station controls the transmission rate of the uplink user data based on the absolute transmission rate of the uplink user data which is transmitted from a serving cell for the mobile station via the absolute transmission rate control channel, without considering the relative transmission rate of the uplink user data regardless of whether or not the relative transmission rate control channel is transmitted.

5. A radio network controller configured for use in a mobile communication system capable of controlling, at a mobile station, a transmission rate of uplink user data, based on an absolute transmission rate of uplink user data which is transmitted via an absolute transmission rate control channel and a relative transmission rate of uplink user data which is transmitted via a relative transmission rate control channel;

wherein the radio network controller is configured to notify, to the mobile station, information for identifying the absolute transmission rate control channel to be transmitted by a serving cell for the mobile station, and not to notify, to the mobile station, information for identifying the relative transmission rate control channel, when the mobile station establishes a data connection for transmitting uplink user data, and when the mobile station establishes a data connection for transmitting uplink user data, the mobile station is configured to control the transmission rate of the uplink user data based on the absolute transmission rate of the uplink user data which is transmitted from a serving cell for the mobile station via the absolute transmission rate control channel, without considering the relative transmission rate of the uplink user data regardless of whether or not the relative transmission rate control channel is transmitted.

6. The radio network controller according to claim 5, wherein the radio network controller is configured to notify, to a radio base station controlling the serving cell, the information for identifying the absolute transmission rate control channel to be transmitted by the serving cell, and not to notify, to the radio base station, the information for identifying the relative transmission rate control channel, when the mobile station establishes the data connection for transmitting uplink user data.

* * * * *